United States Patent
Stoner

(10) Patent No.: US 7,910,017 B2
(45) Date of Patent: Mar. 22, 2011

(54) LOW TEMPERATURE HEAT TRANSFER FLUID COMPOSITION COMPRISING ALKYLBENZENE AND DIBUTYL ETHER

(75) Inventor: Sean E. Stoner, Philadelphia, PA (US)

(73) Assignee: Paratherm Corporation, West Conshohocken, PA (US)

( * ) Notice: Subject to any disclaimer, the term of this patent is extended or adjusted under 35 U.S.C. 154(b) by 0 days.

(21) Appl. No.: 12/177,575

(22) Filed: Jul. 22, 2008

(65) Prior Publication Data

US 2009/0026410 A1    Jan. 29, 2009

Related U.S. Application Data

(63) Continuation of application No. 11/098,504, filed on Apr. 4, 2005, now abandoned, which is a continuation of application No. 10/984,528, filed on Nov. 10, 2004, now abandoned.

(60) Provisional application No. 60/519,565, filed on Nov. 14, 2003.

(51) Int. Cl.
*C09K 5/00*    (2006.01)
(52) U.S. Cl. .................... 252/70; 252/71; 252/73
(58) Field of Classification Search .............. None
See application file for complete search history.

(56) References Cited

U.S. PATENT DOCUMENTS

| 6,086,782 | A | 7/2000 | Hsu et al. | |
| 6,251,300 | B1 | 6/2001 | Takigawa et al. | |
| 7,202,283 | B2 * | 4/2007 | Masuda et al. | 521/48.5 |
| 2002/0050583 | A1 | 5/2002 | Caron et al. | |
| 2005/0029488 | A1 | 2/2005 | Li et al. | |
| 2005/0145822 | A1 | 7/2005 | Drigotas et al. | |

FOREIGN PATENT DOCUMENTS

EP    0947572 A1    6/1999

* cited by examiner

*Primary Examiner* — Necholus Ogden, Jr.
(74) *Attorney, Agent, or Firm* — Fox Rothschild LLP

(57) ABSTRACT

A two component low temperature heat transfer composition comprising 18% to 76% by volume of an ether component and 82% to 24% by volume of an alkylbenzene component which composition transfers thermal energy to itself from a material which is to be cooled and maintains a prolonged liquid phase in the temperature range from room temperature of about 68° F. to a very cold –175° F.; said composition being continually rejuvenated by exposure in alternating cycles to cryogenic or refrigerant materials, such as liquid nitrogen which removes thermal energy from the ether alkylbenzene composition which is maintained in a prolonged liquid phase throughout said temperature range which makes it suitable for use in very cold applications.

20 Claims, 8 Drawing Sheets

Plan View of Bottom L-N$_2$ Evaporation Coil

Plan View of Bottom L-N$_2$ Evaporation Coil

LOW TEMPERATURE HEAT TRANSFER FLUID COMPOSITION COMPRISING ALKYLBENZENE AND DIBUTYL ETHER

CROSS-REFERENCES TO RELATED APPLICATIONS

The present application is a Continuation of U.S. application Ser. No. 11/098,504 now abandoned, filed Apr. 4, 2005, which is a Continuation of U.S. application Ser. No. 10/984,528 (now abandoned), filed Nov. 10, 2004, which in turn claims the priority benefit of U.S. provisional application 60/519,565, filed Nov. 14, 2003, the disclosures of which are each incorporated herein by reference.

BACKGROUND OF THE INVENTION

1. Field of the Invention

This invention concerns a two component composition of an ether compound and an alkylbenzene compound which is useful in the field of heat transfer fluid technology. The composition of the invention is a liquid at room temperature and maintains itself in a liquid phase down to the very super cold temperature of −175° F.

2. Discussion of the Prior Art

The prior art discloses heat transfer processes for the transfer of thermal energy to and from a material to be cooled to very low temperatures. Certain organic solvents have been used alone to lower the temperature of objects, such as alcohols, ketones, halogenated hydrocarbons and terpenes, either as a single component thermal energy transfer material or as a multi-component thermal transfer material.

The problem with the current low temperature heat transfer fluids is that they are not reproducible concerning their physical properties as the temperature goes lower, e.g. they become cloudy, gelatinous, volatile, flash-off, become toxic, change in viscosity as the temperature gets lower. At very low temperatures below 0° F., the physical properties change interfering with the economic objective and render the processes economically undesirable. For example, certain pharmaceutical compounds can only be synthesized in chemical reactions conducted at extremely low temperatures down to −175° F. The field of heat transfer fluids has had a long felt need for formulation that prolong the fluid or liquid phase of the heat transfer material at very cold temperatures. Thus far, no one heat transfer material is suitable for use at very low temperatures.

A new chemistry is needed for reactions that are best perfected at extremely low temperatures. In some reactions more than half of the starting material turns into waste which reduces the amount of desired compounds. Very cold environments provide more selective high yields and purity; for example, in pharmaceutical fields, great efficiencies are achieved by elimination of by product waste. Such reactions require conditions colder than −120° F.

HISTORY OF THE TECHNOLOGY

Over the course of the past century, scientists have liquified nitrogen, oxygen and hydrogen and then compressed them and let them expand which absorbs heat and provides refrigeration. Low temperature science is a major frontier in physics. Scientists have discovered new phenomenon such as super conductivity and superatoms.

SUMMARY OF THE INVENTION

This invention concerns super cooling heat transfer fluid compositions that are characterized by the property of existing in a prolonged liquid state even while their temperature is lowered from room temperature at 68° F. to −175° F. I have discovered that a liquid phase composition which comprises (a) a specific ether component, and (b) an alkylbenzene component blended in certain complementary proportional amounts will continue to exist in the liquid phase even in very cold environments.

I discovered unexpectedly that a composition comprising effective amounts of an ether component and an alkylbenzene component in complementary proportional amounts of 18% to 76% by volume of ether compound, and 82% to 24% by volume of an alkylbenzene compound was able to retain its liquid phase over a wide range of descending temperature environments from 68° F. to −175° F. Specifically, such results were obtained for blends of ether, such as dibutyl ether, and alkylbenzene, such as diethylbenzene. The heat transfer fluid compositions of this invention provided reproducible results in prolonging their liquid phase for at least two cycles of cooling and heating; they remained in a clear liquid phase at temperature ranging from room temperature about 68° F. down to −175° F.

The super cooling liquids of this invention have a wide operational temperature range in which they exist in the liquid phase and do not increase in viscosity, gelation, or sub-phase change. When the heat transfer fluids become gel-like, they lose their efficiency by impeding the circulation of the fluid within the heat transfer system apparatus.

It was unexpected that alkylbenzenes can be mixed with an ether to obtain heat transfer fluid compositions that exhibit characteristics which are superior to either component alone. It has been discovered that mixtures of ether and alkylbenzene produce distinctly different physical properties as compared to either ethers or alkylbenzenes alone. Particularly, it has been discovered that certain heat transfer fluid compositions comprising an ether component and an alkylbenzene component, comprising at least one alkylbenzene, exhibit freezing point temperatures that are lower than either the ether or the alkylbenzene component alone. The heat transfer fluid compositions of the invention comprise (a) an ether component and (b) and alkylbenzene component, comprising at least one alkylbenzene. The ether component and the alkylbenzene component are provided in an effective amount such that the resultant compositions are suitable for use as heat transfer liquids for low temperature applications. Specifically, the ether component and the alkylbenzene component are provided in an effective amount such that the resultant composition retains the liquid phase at temperatures from about 68° F. to −175° F. (20° C. to −115° C.). The ether component of the heat transfer fluid compositions of the invention consists of only one ether. The one ether selected is dibutyl ether. The alkylbenzene component of the heat transfer fluid compositions is defined as a benzene alkylated with a hydrocarbon. The alkylbenzene may be selected from the group of alkylbenzenes comprising cumene, diethyl benzene, trimethyl benzene, xylene, propyl benzene and butyl benzene. The heat transfer fluid compositions of the invention may optionally contain various additives. For example, the fluid compositions of the invention may optionally contain at least one antioxidant, e.g. butylated hydroxy toluene (BHT) and vitamin E; and a stabilizing agent, e.g. hydroquione.

It is an object of this invention to provide heat transfer fluid compositions wherein the ether component is dibutyl ether and the alkylbenzene component comprises at least one alkylbenzene selected from the group consisting of cumene, diethyl benzene, trimethyl benzene, xylene, propyl benzene and butyl benzene and wherein the resultant composition remains in the liquid phase at temperatures in the range from about 68° F. to −175° F. (20° C. to −115° C.).

It is another object of the invention to provide a low temperature heat transfer system using a process comprising (a) transferring thermal energy from the heat transfer fluid to a cooling fluid like liquid nitrogen such that the heat transfer fluid is cooled to a temperature between about 68° F. to −175° F. (20° C. to −115° C.); (b) transferring thermal energy from an object to be cooled to the heat transfer liquid; and repeating such cycles until said object is cooled to the desired temperature; wherein said heat transfer liquid consists of a heat transfer fluid composition comprising (a) an ether component, comprising one ether; and (b) an alkylbenzene component, comprising at least one alkylbenzene and wherein said components are provided in an effective amount such that the resultant composition is prolonged in the liquid phase at temperatures in the range from about 68° F. to −175° F. (20° C. to −115° C.).

During the course of my search for a suitable heat transfer fluid for use at very cold temperatures, I learned that some compositions which were represented as good heat transfer materials in very cold applications, actually did not give the expected results, and some of the prior art test data was erroneous. For example, the compound decahydranaphthalene which is similar to the behavior of a alkyl benzene, specifically diethyl benzene compound and had all of the physical characteristics of a potential heat transfer composition useful at very low temperatures actually solidified at a much warmer environment then suggested in the literature and was too viscous to be useful as a heat transfer fluid.

BRIEF DESCRIPTION OF THE DRAWINGS, TABLES AND GRAPHS

In my search for a heat transfer fluid which would continue to exist in the liquid phase at super cool temperatures down to −175° F., I was concerned about the safety of the material so I investigated the physical properties of the compositions that I tested. It is essential that the flash point be in a safer range; a relatively low flash point would be considered a dangerous condition. The prior art discloses a combination of a terpene and an alkylbenzene for use as a heat transfer fluid. Specifically, d-limonene has been used as a representative of a terpene, and the alkylbenzene was cumene. I could not get the solidification point down to the very cold bottom of the range with the heat transfer combinations shown in the prior art. In fact, some of the alleged test data disclosed in the literature was not accurate. The alkylbenzene uncovered some unexpected results and discovered that most heat transfer compositions solidified too soon, e.g. terpenes at −73° C. (−100° F.); ethers at −95° C. (−140° F.); and alkylbenzene at −84° C. (−112° F.). I tried to find a ketone composition that would work, but none did. The following are illustrations of my experiments and tests. These illustrations compare the prior art compositions with the products of this invention.

TABLE 1 is a chart showing the experimental freezing temperatures of the pure components, diethyl benzene, d-limonene, cumene, and dibutyl ether, tested to show repeatability of the testing apparatus.

TABLE 1

| Component | Freeze Point, ° C. | ° F. | Sample |
|---|---|---|---|
| Dibutyl Ether, Sigma Aldrich | −96.9 | −142.4 | 1 |
| Dibutyl Ether, Sigma Aldrich | −96.6 | −141.9 | 2 |
| Dibutyl Ether, Sigma Aldrich | −96.5 | −141.7 | 3 |
| Diethyl Benzene, Sigma Aldrich | −99.9 | −147.8 | 1 |
| Cumene, Sigma Aldrich | −96.1 | −141.0 | 1 |
| Cumene, Sigma Aldrich | −96.8 | −142.2 | 2 |
| D-Limonene, Florida Chemical | −99.1 | −146.4 | 1 |
| D-Limonene, Florida Chemical | −97.6 | −143.7 | 2 |

TABLE 2 is a chart showing the experimental blend ratios of various ethers with diethyl benzene. All chemicals listed are from Sigma-Aldrich. None of the ratios were capable of maintaining their liquid phase down to −175° F. (−115° C.).

TABLE 2

| Ether with Diethyl benzene | Volume % |
|---|---|
| 1. Diethyl Benzene | 71% |
| 1-Methoxy-2-Propanol, 98% | 29% |
| Diethyl Benzene | 21% |
| 1-Methoxy-2-Propanol, 98% | 79% |
| 2. Diethyl Benzene | 32% |
| 1-Methoxy-2-Propanol-Acetate, 99.5+% | 68% |
| Diethyl Benzene | 72% |
| 1-Methoxy-2-Propanol-Acetate, 99.5+% | 28% |
| 3. Diethyl Benzene | 32% |
| Di(Propylene Glycol)Methyl Ether Acetate, 98+%, mixture of isomers | 68% |
| Diethyl Benzene | 72% |
| Di(Propylene Glycol)Methyl Ether Acetate, 98+%, mixture of isomers | 28% |
| 4. Diethyl Benzene | 34% |
| Di(Ethylene Glycol) Methyl Ether, 99.6+% | 66% |
| Diethyl Benzene | 73% |
| Di(Ethylene Glycol) Methyl Ether, 99.6+% | 27% |
| 5. Diethyl Benzene | 32% |
| 2-Ethoxy Ethanol, 99% | 68% |
| Diethyl Benzene | 72% |
| 2-Ethoxy Ethanol, 99% | 28% |
| 6. Diethyl Benzene | 33% |
| 2-Ethoxy Ethanol-Acetate, 98% | 67% |
| Diethyl Benzene | 72% |
| 2-Ethoxy Ethanol-Acetate, 98% | 28% |
| 7. Diethyl Benzene | 28% |
| 4-Methyl-2-Pentanone, 99+% | 72% |
| Diethyl Benzene | 68% |
| 4-Methyl-2-Pentanone, 99+% | 32% |
| 8. Diethyl Benzene | 29% |

TABLE 2-continued

| Ether with Diethyl benzene | Volume % |
|---|---|
| 3-Methyl-l-Butanol, 99.8% GC | 71% |
| Diethyl Benzene | 69% |
| 3-Methyl-1-Butanol, 99.8% GC | 31% |

All chemicals listed in Table 2 are commercially available from Sigma-Aldrich Chemical Company

DETAILED DESCRIPTION OF THE DRAWINGS AND EXAMPLES

Figure 1:
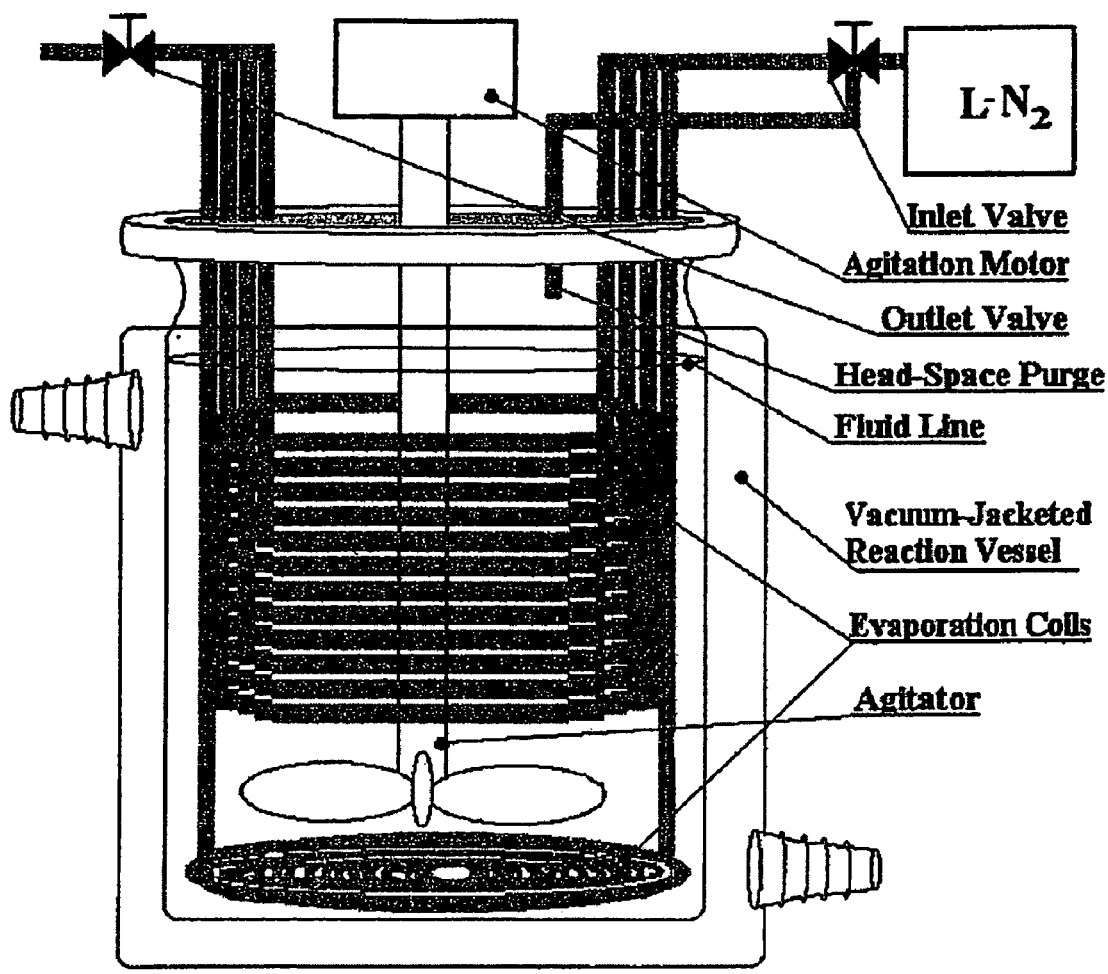
FIG. 1 is a depiction of the experimental apparatus used to test the freezing and melting point temperature characteristics of the heat transfer fluid compositions of the invention.
Figure 1:
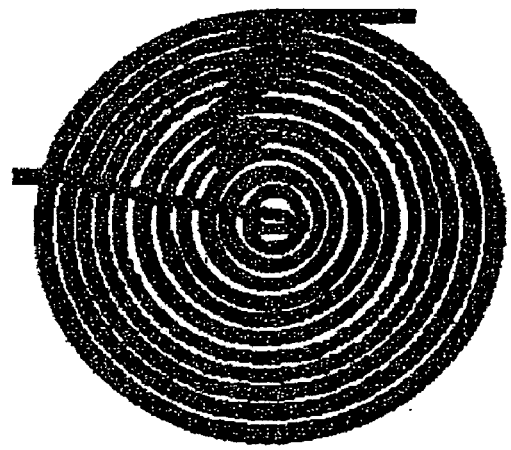

The chemicals used in the testing are commercially available. The purpose of these experiments was to determine the freezing point temperatures of the d-limonene, cumene, dibutyl ether, and diethyl benzene, and show the repeatability of the freeze point apparatus. These tests were performed using the apparatus depicted in FIG. 1. The test apparatus shown in FIG. 1 is called a freeze point apparatus. The principal components of the apparatus are evaporation coils made of cooper to which liquid nitrogen enters through the liquid nitrogen line through the inlet valve and exits through the nitrogen line and the outlet valve. The evaporation coils are submerged in a bath of liquid whose freezing characteristics are to be determined. Agitation of liquid is provided by a mechanical stirrer connected to a motor. Thermocouples are located at different points to measure the temperatures of the liquid (6) as well as the evaporation coils. The glass dewar is vacuum jacketed to provide insulation from the ambient surroundings.

The procedure used to determine the freezing point characteristics of the food grade d-limonene, the cumene, dibutyl ether, and diethyl benzene follows:
1. Measuring out about 925 ml of d-limonene, cumene, dibutyl ether, and diethyl benzene;
2. Pouring the 925 ml of d-limonene, cumene, dibutyl ether, and diethyl benzene samples into a clean dewar;
3. Agitating the d-limonene, cumene, dibutyl ether, and diethyl benzene samples with stirrer rotating at a rate of about 500 rpm;
4. Cooling the d-limonene, cumene, dibutyl ether, and diethyl benzene samples, respectively, by initiating the flow of liquid nitrogen to the evaporation coil by opening inlet valve;
5. Operating inlet and outlet control valves to regulate the flow of liquid nitrogen to the evaporation coil such that the temperature difference between the d-limonene, cumene, dibutyl ether, and diethyl benzene samples in the dewar and the evaporation coil does not exceed 30° F.;
6. Continuing cooling until the d-limonene, cumene, dibutyl ether, and diethyl benzene sample freezes, or until the temperature minimum for the apparatus is reached (i.e., continued cooling does not result in a reduction in the d-limonene temperature or agitation by the mixer; this minimum temperature has been determined to be −175° F. (−115° C.) for our test purposes;
7. Observing the temperature of the d-limonene, cumene, dibutyl ether, and diethyl benzene samples when freezing occurs, if freezing occurs during the warming phase; and,
8. Stopping the flow of liquid nitrogen to the evaporation coil to allow the d-limonene, cumene, dibutyl ether, and diethyl benzene samples to warm through absorption of heat from the ambient surroundings;
9. Observing the temperature of the d-limonene, cumene, dibutyl ether, and diethyl benzene samples when freezing occurs, if freezing occurs during the warming phase; and,
10. Optionally heating the d-limonene, cumene, dibutyl ether, and diethyl benzene samples with nitrogen gas to speed melting during the experiment.

Figure 8:
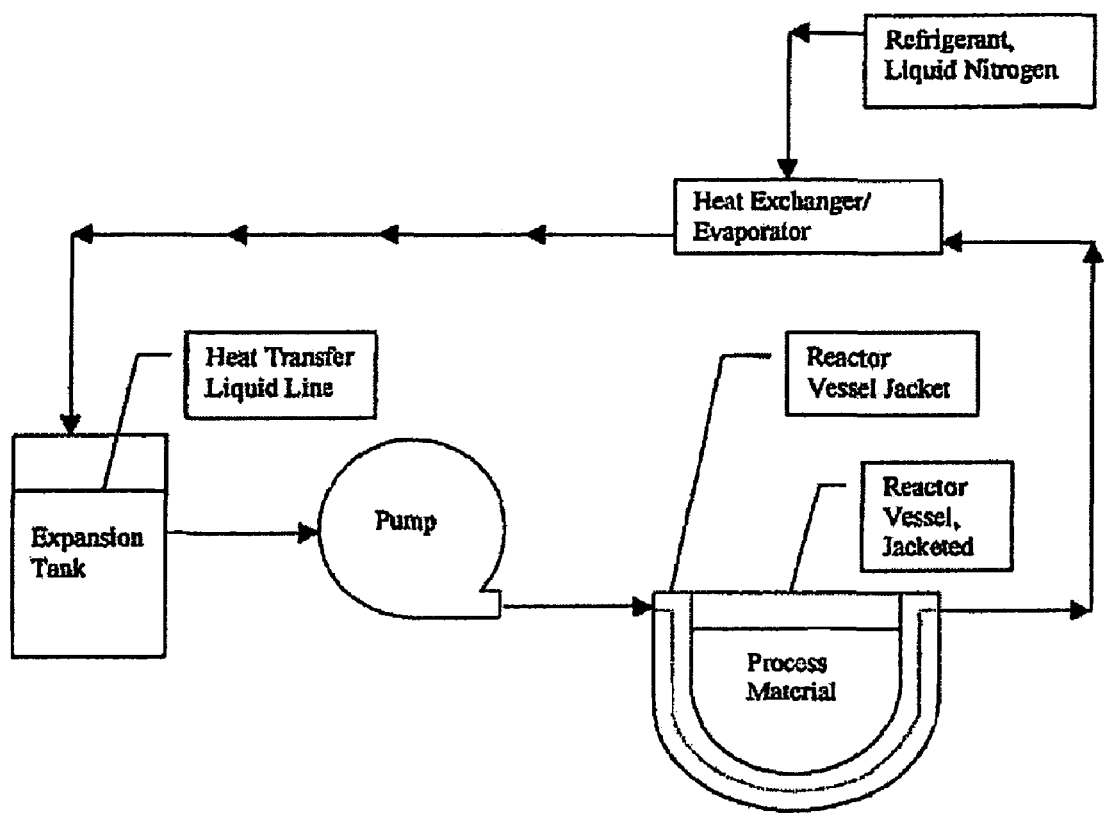
FIG. 8 is a diagrammatic view of a heat transfer process system using a heat transfer fluid composition of the present invention.

The results of the experiments performed on the d-limonene, cumene, dibutyl ether, and diethyl benzene samples are provided in the chart in FIG. 8. These experiments demonstrate that the d-limonene tested had a freezing point temperature range of about −143.7 to −146.4° F. (−97.6 to −99.1° C.).

An identical test using the same test apparatus was performed on diethyl benzene to determine its freezing point temperature. The dibutyl benezene was determined to have a freezing point temperature of about −147.8° F. (−99.9° C.).

An identical test using the same test apparatus was performed on dibutyl ether to determine its freezing point temperature. The dibutyl ether was determined to have a freezing point temperature range of about −141.7 to 142.4° F. (−96.5 to −96.9° C.).

An identical test using the same test apparatus was performed on cumene to determine its freezing point temperature range. The cumene was determined to have a freezing point temperature of about −141 to 142.2° F. (−96.1 to 96.8° C.).

The same test apparatus was used to determine the freezing point temperatures of all the combinations and concentrations of alkylbenzenes, namely cumene, diethyl benzene, trimethyl benzene, xylene, propyl benzene, and butyl benzene, with dibutyl ether. These results can be seen in FIGS. 3 through 7.

Furthermore, the same test apparatus was used to determine the freezing point temperatures of all of the combinations and concentrations of ethers with an alkylbenzene, namely diethyl benzene. None of these combinations were able to stay in the liquid form upon cooling to about −175° F. (−115° C.). A chart of these concentrations ranges can be seen in FIG. 10. This data indicated that not all ethers are viable components in this invention; as a result of my prolific testing, I discovered that the dibutyl ether was a critical component of this invention.

The chemical compounds used in the following examples are commercially available.

Example 1

Figure 2:
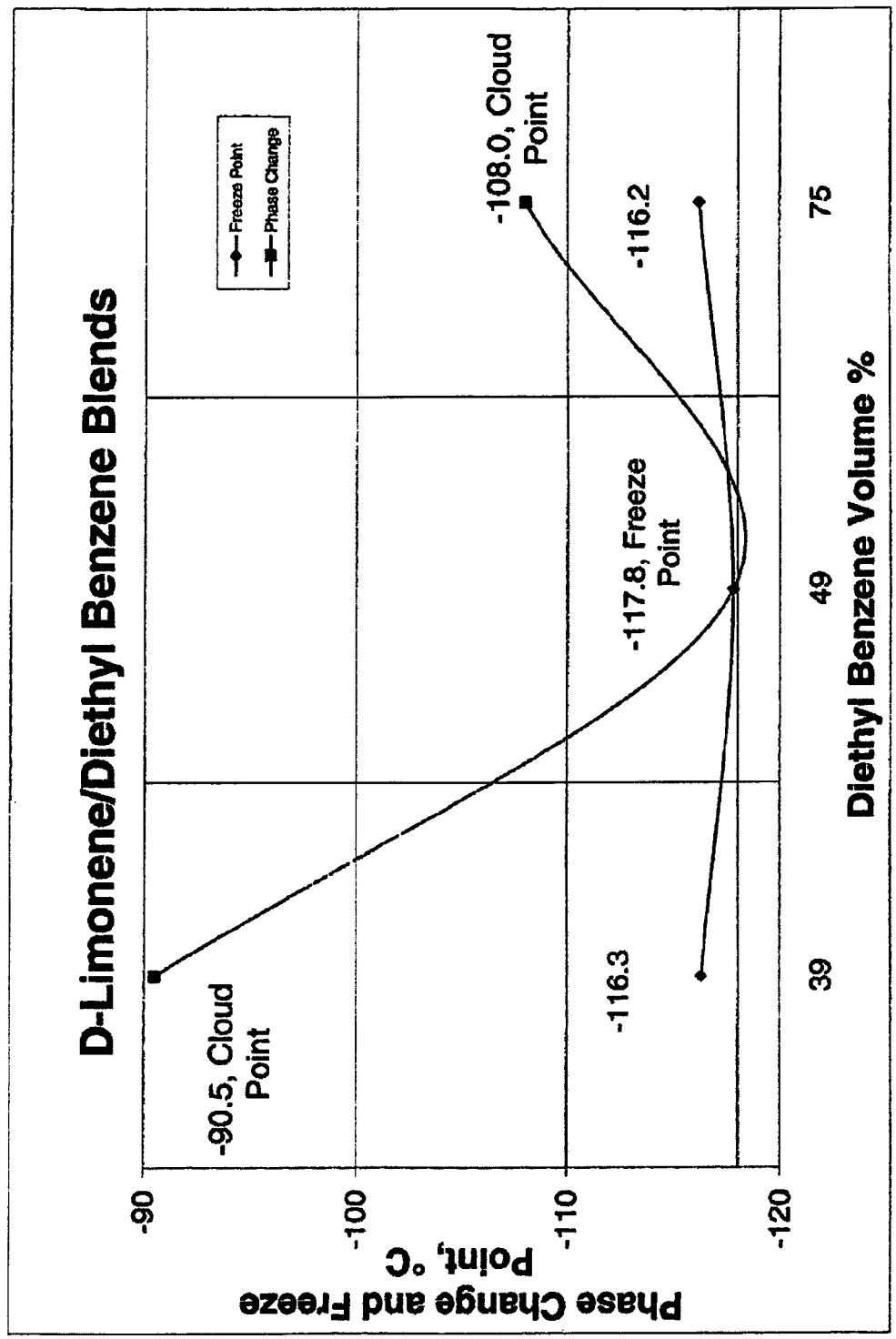
FIG. 2 is a graph showing the experimental phase changes (e.g. cloud point, gel point) and freezing temperature versus concentrations of composition d-limonene (95.6% by weight) with diethyl benzene.
Figure 3:
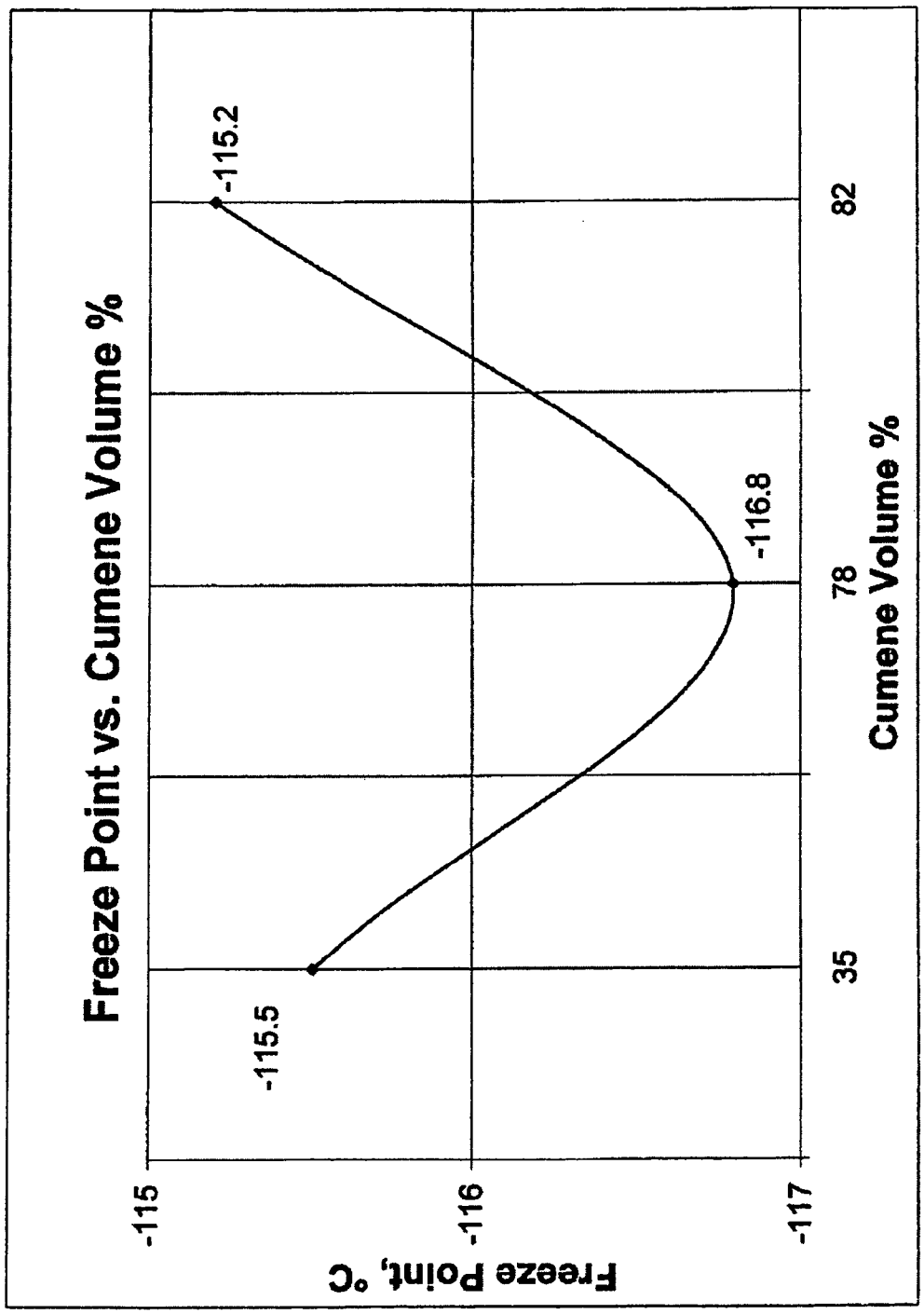
FIG. 3 is a graph showing the experimental freezing temperature versus concentrations of composition; cumene with dibutyl ether.
Figure 4:
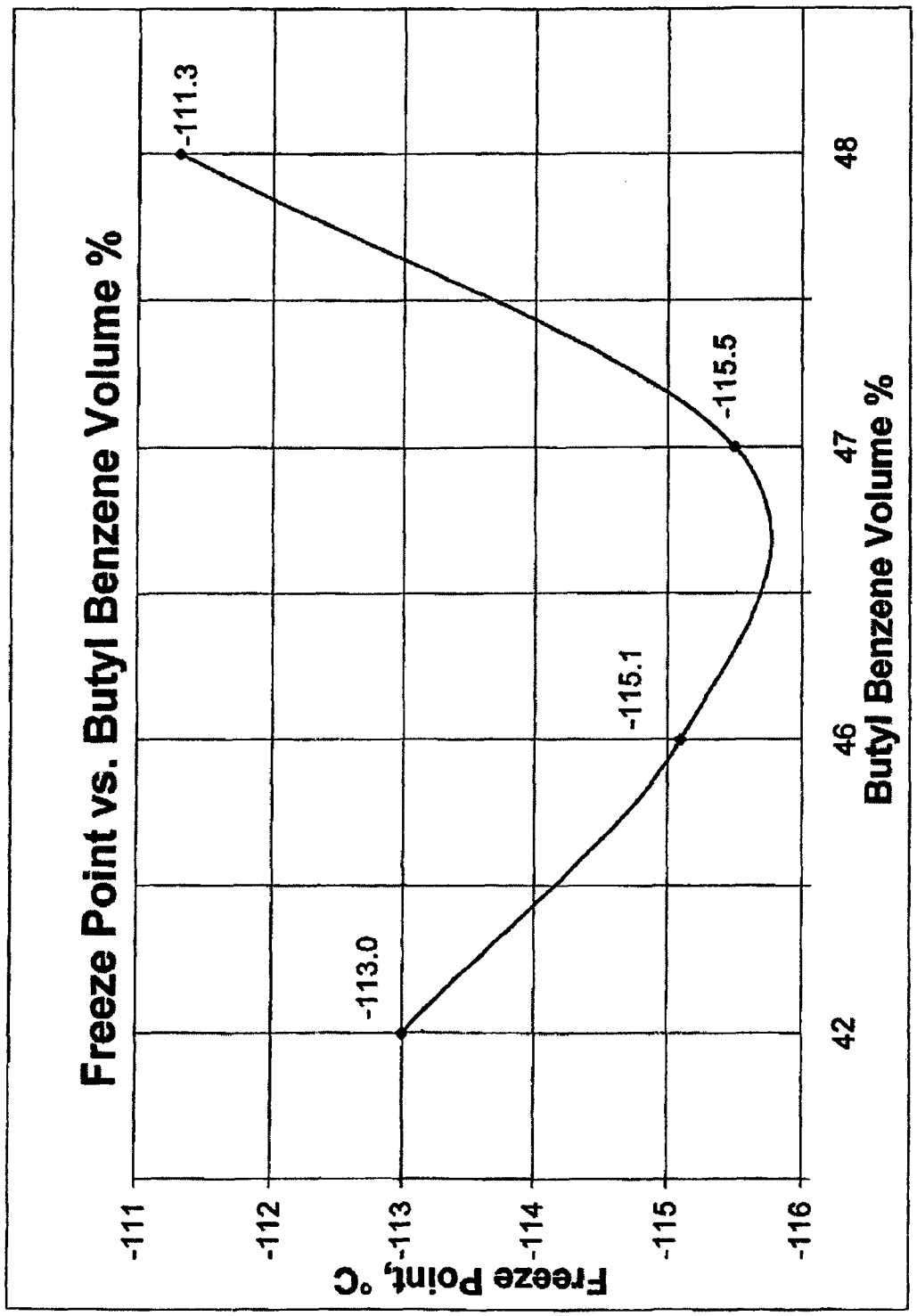
FIG. 4 is a graph showing the experimental freezing temperature versus concentrations of composition; butyl benzene with dibutyl ether.
Figure 5:
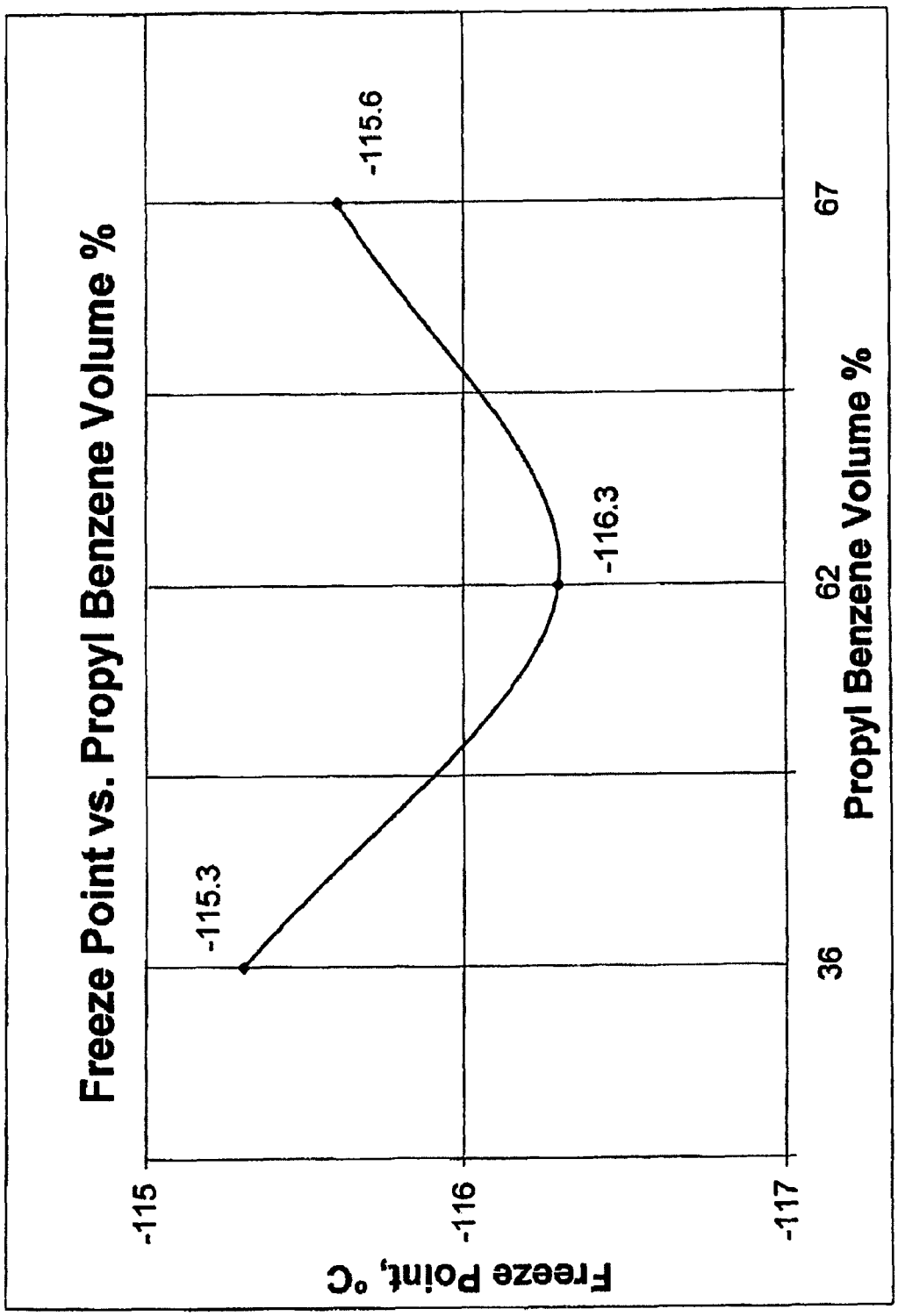
FIG. 5 is a graph showing the experimental freezing temperature versus concentrations of composition; propyl benzene with dibutyl ether.
Figure 6:
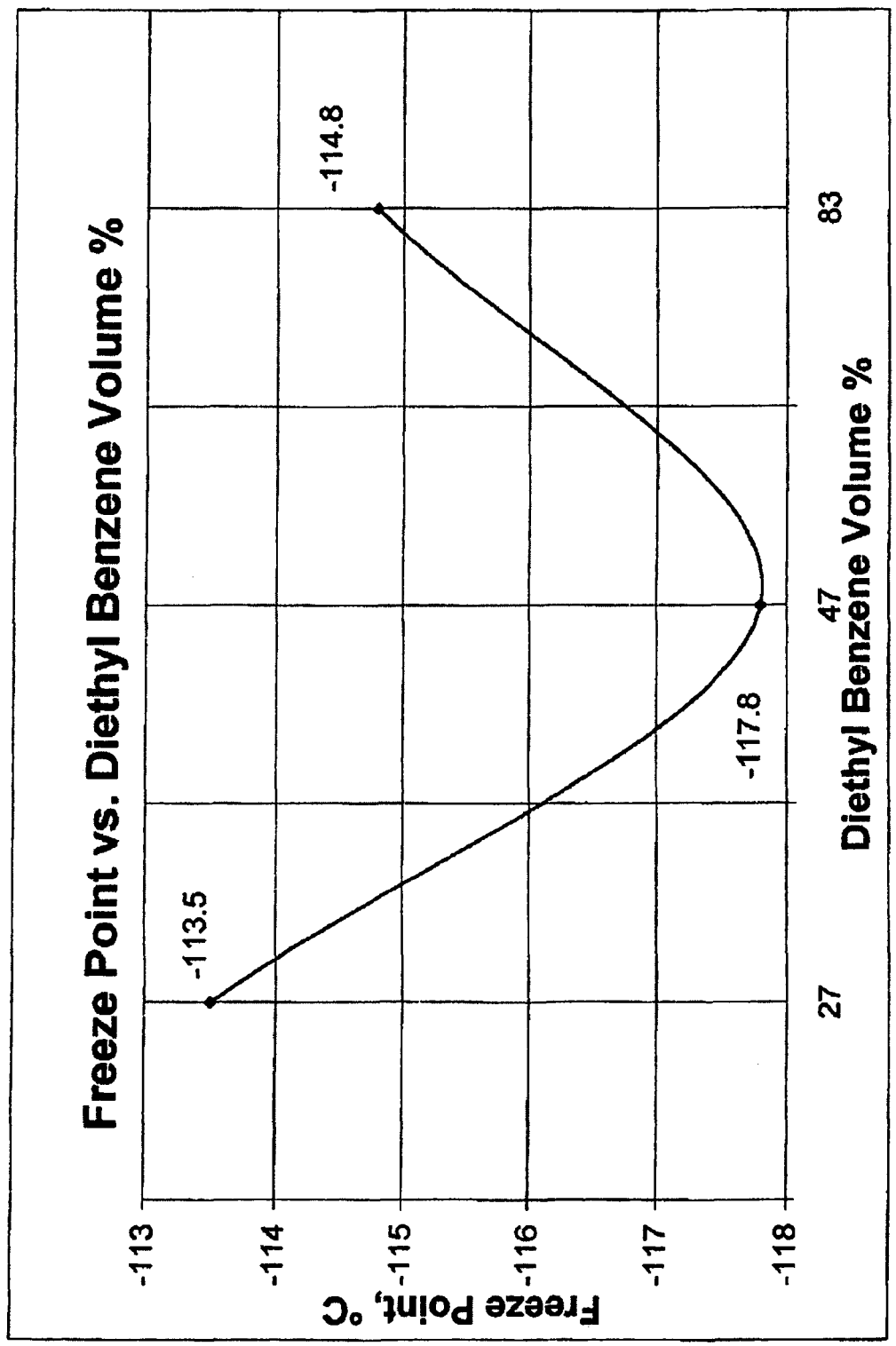
FIG. 6 is a graph showing the experimental freezing temperature versus concentrations of composition; diethyl benzene with dibutyl ether.
Figure 7:
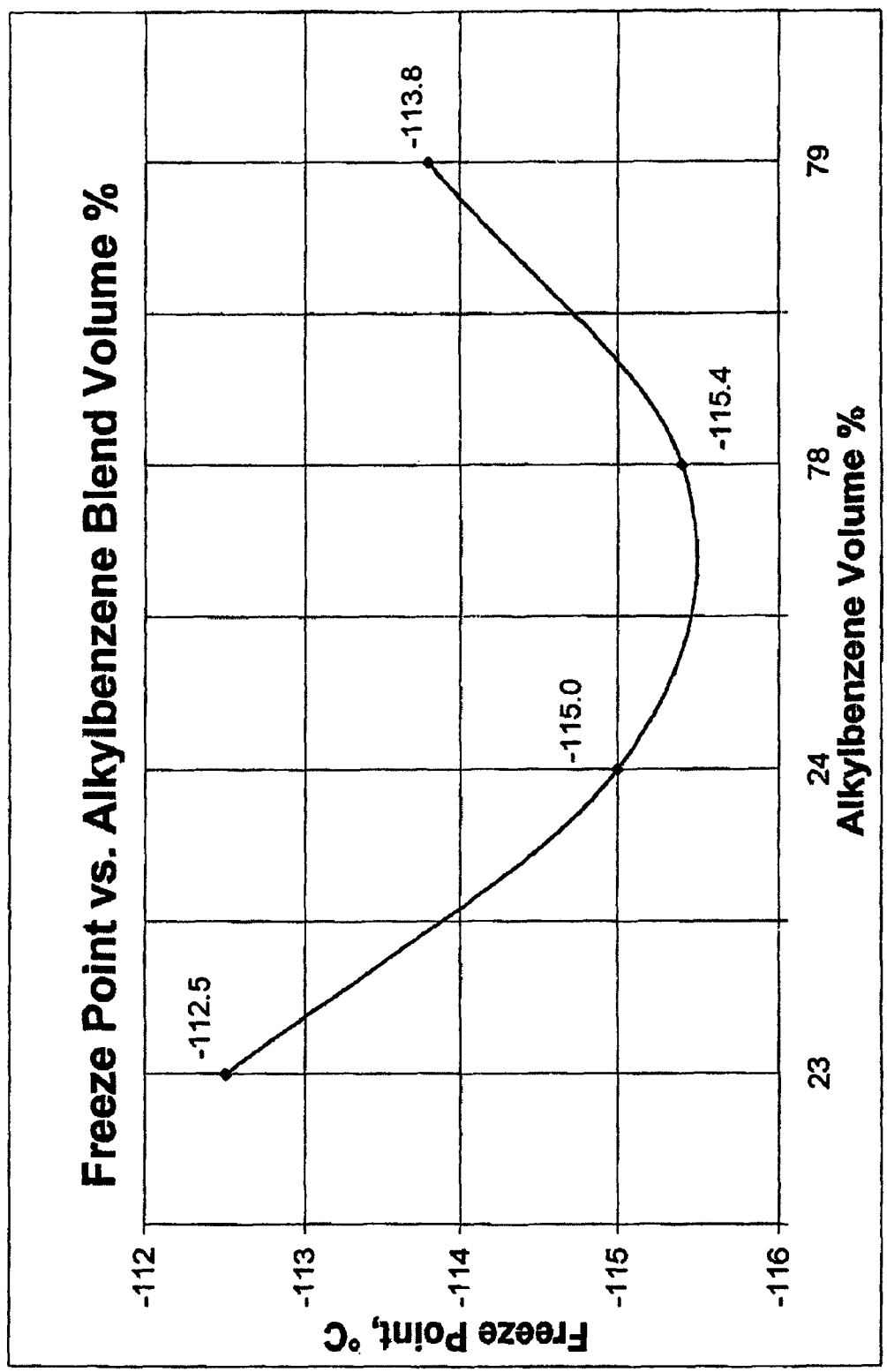
FIG. 7 is a graph showing the experimental freezing temperature versus concentrations of composition; 1,2,4-trimethyl benzene, xylene, cumene proprietary blend with dibutyl ether.

Using the same testing apparatus and procedure as discussed above with regard to d-limonene, cumene, dibutyl ether, and diethyl benzene, tests were performed to determine the freezing point temperature characteristics of heat transfer fluid compositions comprising about 39%, 49%, and 75% by volume diethyl benzene and about 61%, 51% and 25% by volume d-limonene. The freezing point temperatures for the diethyl benzene d-limonene compositions were determined to be about −175° F. (−115° C.). A graphical interpretation of the results can be seen in FIG. 2. No solidification or crystallization was observed during either the cooling or the warming cycles for the 49% by volume diethyl benzene sample. The 39% and 75% by volume diethyl benzene samples were cooled down to −116.3° C. (−177° F.) and −116.2° C. (−177° F.) respectively. Upon heating the samples changed phase by turning cloudy at −90.5° C. (−131° C.) and −108.0° C. (−162° F.) respectively. All samples between 40% and 74% by volume did not exhibit this phenomenon and were able to be cooled to and heated from −175° F. (−115° C.) without phase change.

Example 2

Using the same testing apparatus and procedures as discussed above in Example 1, tests were performed to determine the freezing point temperature characteristics of heat transfer fluid compositions comprising about 35%, 78%, and 82%, by volume cumene and about 65%, 22%, and 18% by volume dibutyl ether. The freezing point temperatures for the diethyl benzene/dibutyl ether compositions were determined to be about −175° F. (−115° C.). A graphical interpretation of the results can be seen in FIG. 3. No solidification or crystallization was observed during either the cooling or the warming cycles.

Example 3

Using the same testing apparatus and procedure as discussed above in Example 1, tests were performed to determine the freezing point temperature characteristics of heat transfer fluid compositions comprising about 42%, 46%, 47%, and 48% by volume butyl benzene and about 58%, 54%, 53%, and 52% by volume dibutyl ether. The freezing point temperatures for the 46% to 47% by volume butyl benzene/dibutyl ether compositions were determined to be about −175° F. (−115° C.). The examples that were 42% and 48% by volume froze at temperatures higher in temperature than −1750 (−115° C.). A graphical interpretation of the results can be seen in FIG. 4. No solidification or crystallization was observed during either the cooling or the warning cycles of samples 46% and 47% by volume.

Example 4

Using the same testing apparatus and procedure as discussed above in Example 1, tests were performed to determine the freezing point temperature characteristics of heat transfer fluid compositions comprising about 36%, 62%, and 67%, by volume propyl benzene and about 63%, 38%, and 33% by volume dibutyl ether. The freezing point temperatures for the propyl benzene/dibutyl ether compositions were determined to be about −1750 (−115° C.). A graphical interpretation of the results can be seen in FIG. 5. No solidification or crystallization was observed during either the cooling or the warming cycles.

Example 5

Using the same apparatus and procedure as discussed above in Example 1, tests were performed to determine the freezing point temperature characteristics of heat transfer fluid compositions comprising about 27%, 47%, and 83%, by volume diethyl benzene and about 73%, 3%, and 17% by volume dibutyl ether. The freezing point temperatures of the diethyl benzene/dibutyl ether compositions between 28%, and 82% by volume diethyl benzene and 72% and 18% by volume diethyl benzene were determined to be about −1750 (−115° C.). The examples that were 27% and 83% by volume diethyl benzene froze at temperatures higher in temperature than −1750 (−115° C.). A graphical interpretation of the results can be seen in FIG. 6. No solidification or crystallization was observed during either the cooling or the warming cycles of sample compositions between 28% and 82% by volume diethyl benzene and 72% and 18% by volume dibutyl ether.

Example 6

Using the same apparatus and procedure as discussed above in Example 1, tests were performed to determine the freezing point temperature characteristics of heat transfer fluid compositions comprising about 23%, 24%, 78% and 79% by volume alkylbenzene blend and about 77%, 76%, 22%, and 21%, by volume dibutyl ether compositions were determined to be about −1750 (−115° C.). The examples 23% and 79% by volume froze at temperatures higher in temperature than −1750 (−115° C.). A graphical interpretation of the results can be seen in FIG. 7. No solidification or crystallization was observed during the either the cooling or the warning cycles of samples 24% and 78%.

Another aspect of the invention resides in the industrial application of the heat transfer fluid compositions, of the invention in heat transfer process systems. In order to illustrate the industrial utility of this invention reference should be made to FIG. 9. FIG. 9 depicts a closed loop cooling system comprised of a pump, a jacketed reactor vessel holding the process material to be cooled, a heat exchanger/evaporator, and an expansion tank. Heat transfer liquid comprises a low temperature heat transfer fluid composition comprising (a) an ether component, comprising (a) at least one ether; and (b) an alkylbenzene component, comprising at least one alkylbenzene wherein the said components are provided in an effective amount such that the resultant composition remains in the liquid phase at temperatures in the range from about 68° F. to −175° F. (200° C. to −115° C.). The pump draws the heat transfer fluid from the expansion tank and impels the heat transfer liquid through the reactor vessel jacket of the reactor vessel containing the process material to be cooled. The heat transfer liquid passes through the reactor jacket causing the reduction in temperature of the process material and passes to the heat exchanger/evaporator. The heat exchanger/evaporator removes the absorbed heat transferred from the process material by means of heat extraction or cooling by subjecting the heat transfer liquid to a refrigerant such as liquid nitrogen and liquid carbon dioxide or an ultra low temperature refrigerant used in a mechanical refrigeration system, i.e., R-13, R-14, R-23, R-503 and R-508. The cooled heat transfer liquid then returns to the expansion tank for recirculation and reuse in the cooling system.

A temperature control device is used to modulate the flow of the refrigerant to maintain the temperature of the recirculating heat transfer liquid at a temperature below about 68° F. (20° C.), most preferably of about −175° (−115° C.). The recirculated heat transfer liquid is again pumped to the reactor vessel jacket where it absorbs thermal energy from the process material to be cooled in the reactor. This causes the heat transfer liquid to increase in temperature. The process is repeated for as long as is necessary until the process material to be cooled is cooled to the desired temperature.

The heat transfer fluid compositions of the invention provide for lower operating temperatures than can be achieved with presently available commercially viable heat transfer liquids. The heat transfer fluid composition of the invention are of value to industries that require very low temperatures for process control, chemical production, condensation, freeze dryingflyophilization, environmental conditioning, cold storage and in the synthesis of pharmaceutical compounds.

What is claimed is:

1. A composition for the transfer of thermal energy which comprises (a) dibutyl ether in the range of 18 percent to 76 percent by volume, and (b) an alkylbenzene component in the range of 82 percent to 24 percent by volume.

2. The composition of claim 1 wherein said alkylbenzene is selected from the group consisting of diethyl benzene cumene, trimethyl benzene, xylene, propyl benzene and butyl benzene.

3. The composition of claim 1 wherein the alkylbenzene component is diethyl benzene.

4. The composition of claim 1 wherein components (a) and (b) are present in sufficient amounts to prolong the composition in its liquid phase at any temperature in the range from about 68° F. to about −175° F.

5. The composition of claim 1 wherein said dibutyl ether and alkylbenzene are present in complimentary proportional percentage amounts to maintain the composition in liquid phase at any temperature in the range from room temperature of about 68° F. to about −175° F.

6. A method for extracting thermal energy from an object which comprises:
   a first step of contacting a heat transfer fluid material with a cooling fluid means to reduce said fluid to any temperature in the range from 68° F. to −175° F., wherein said heat transfer fluid material comprises (a) dibutyl ether in the range of 18 percent to 76 percent by volume, and (b) an alkylbenzene component in the range of 82 percent to 24 percent by volume;
   a second step of contacting said object to be cooled with said cooled heat transfer fluid material; and
   repeating said first and second step in cycles until said object is cooled to the desired temperature.

7. The method of claim 6 wherein the alkylbenzene component is diethylbenzene.

8. A method for making a heat transfer fluid composition having a liquid phase at any temperature in the range of 68° F. to −175° F. which comprises blending (a) 18 percent to 76 percent by volume of diethyl ether, and (b) 82 percent to 24 percent by volume of an alkylbenzene compound.

9. The method of claim 8 wherein the alkylbenzene component is diethyl benzene.

10. A composition for the transfer of thermal energy which comprises (a) an ether component present in the range of about 19 percent to about 75 percent by volume, and (b) an alkylbenzene component present in the range of about 81 percent to about 25 percent by volume, wherein the ether compound is dibutyl ether.

11. The composition of claim 10 wherein the alkylbenzene component is diethyl benzene.

12. The composition of claim 10 wherein said ether component and said alkylbenzene component are present in sufficient amounts to prolong the composition in its liquid phase at any temperature in the range from about 68° F. to about −175° F.

13. The composition of claim 10 wherein said dibutyl ether and said alkylbenzene are present in complimentary proportional percentage amounts to maintain the composition in liquid phase at any temperature in the range from room temperature of about 68° F. to about −175° F.

14. The composition of claim 10 consisting essentially of said ether component and said alkylbenzene component.

15. The composition of claim 14 wherein said alkylbenzene component is diethyl benzene.

16. The composition of claim 1 wherein said dibutyl ether is present in the range of 18 percent to about 54 percent by volume, and said alkylbenzene component is present in the range of 82 percent to about 46 percent by volume.

17. The composition of claim 16 wherein said dibutyl ether is present in the range of 18 percent to about 38 percent by volume, and said alkylbenzene component is present in the range of 82 percent to about 62 percent by volume.

18. The composition of claim 17 wherein said dibutyl ether is present in an amount of about 33 percent by volume, and said alkylbenzene component is present in an amount of about 67 percent by volume.

19. The composition of claim 17 wherein said dibutyl ether is present in an amount of about 38 percent by volume, and said alkylbenzene component is present in an amount of about 62 percent by volume.

20. A composition for the transfer of thermal energy which comprises (a) an ether component in the range of 18 percent to 76 percent by volume, and (b) an alkylbenzene component in the range of 82 percent to 24 percent by volume, wherein said alkylbenzene is selected from the group consisting of diethyl benzene, cumene, trimethyl benzene, xylene, propyl benzene, and butyl benzene.

* * * * *